United States Patent [19]

Imamura

[11] Patent Number: 5,770,271
[45] Date of Patent: Jun. 23, 1998

[54] METHOD FOR TREATING THE SURFACE OF A BASE AND PRODUCTION OF AN INK-JET RECORDING HEAD USING THE METHOD

[75] Inventor: Isao Imamura, Kawasaki, Japan

[73] Assignee: Canon Kabushiki Kaisha, Tokyo, Japan

[21] Appl. No.: 707,764

[22] Filed: Sep. 4, 1996

[30] Foreign Application Priority Data

Sep. 4, 1995 [JP] Japan .................................. 7-248274
Aug. 6, 1996 [JP] Japan .................................. 8-221882

[51] Int. Cl.$^6$ .............................. B05D 1/38; B05D 3/02; B05D 3/10; B05D 5/04
[52] U.S. Cl. ................... 427/412.1; 427/387; 427/393.4; 427/419.2; 427/419.5
[58] Field of Search .............................. 427/387, 419.5, 427/419.2, 407.1, 412.1, 393.4

[56] References Cited

U.S. PATENT DOCUMENTS

| | | | |
|---|---|---|---|
| 4,368,476 | 1/1983 | Uehara et al. ......................... | 347/56 |
| 4,525,425 | 6/1985 | Church ................................. | 427/419.5 |
| 4,842,990 | 6/1989 | Herrmann et al. ..................... | 430/212 |
| 5,010,356 | 4/1991 | Albison ................................ | 427/387 |
| 5,148,193 | 9/1992 | Inamoto et al. ....................... | 427/256 |
| 5,310,720 | 5/1994 | Shin et al. ............................ | 427/397.7 |
| 5,378,504 | 1/1995 | Bayard et al. ........................ | 427/385.5 |
| 5,405,655 | 4/1995 | Blum et al. ........................... | 427/387 |
| 5,482,660 | 1/1996 | Yamamoto et al. ................... | 156/244.18 |
| 5,523,161 | 6/1996 | Goodwin ............................... | 427/387 |
| 5,552,476 | 9/1996 | Halling ................................. | 427/387 |
| 5,595,785 | 1/1997 | Hindagolla et al. ................... | 347/47 |
| 5,617,631 | 4/1997 | Nguyen ................................ | 347/47 |

*Primary Examiner*—Diana Dudash
*Attorney, Agent, or Firm*—Fitzpatrick, Cella, Harper & Scinto

[57] ABSTRACT

The invention provides a method for treating the surface of a plastic base comprising the step of applying a coating solution containing a material selected from the group consisting of alumina sol, silanol, and perhydropolysilazane represented by the following general formula (I), on the surface of the base,

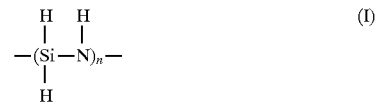

forming a surface modification layer by drying and curing the coating solution at a temperature which does not form a ceramic from the material, and then forming an ink-repellent layer on the surface modification layer.

8 Claims, 3 Drawing Sheets

METHOD FOR TREATING THE SURFACE OF A BASE AND PRODUCTION OF AN INK-JET RECORDING HEAD USING THE METHOD

BACKGROUND OF THE INVENTION

1. Field of the Invention

The present invention relates to a method for treating the surface of a base and a method for making an ink-jet recording head using the method. The invention particularly relates to providing an ink-repellent layer on the surface of a base, such as a plastic, which is not suitable for high temperature treatment. The method improves the adhesiveness between the base and the ink-repellent layer by preliminarily applying a specified surface modification to the base.

2. Related Background Art

When a functional film, e.g. a water-, ink- or oil-repellent layer, is formed on the surface of a base, such as a plastic, which is not suitable for high temperature treatment, the surface of the base may be preliminarily modified by various methods to improve its adhesion to the functional film.

Methods for modifying the surface include sandblasting, etching, and plasma ashing. These prior art methods, however, involve the following problems:

1) Sandblasting is not suitable for a base having a complicated shape, and it merely roughens the surface of the base without basically modifying the surface;
2) In etching, an etching agent may adversely affect the base, and some base materials are not suitable for etching; and
3) Like sandblasting, plasma ashing is not suitable for a base having a complicated shape and is less economical because an expensive apparatus is needed.

In contrast, a surface modification layer or coating layer has been provided on the surface of a base as an effective means to readily modify the surface of the base such as a plastic. It has been well known that a surface modification layer, such as a primer layer or a silane layer, may be provided on the surface of the base by applying a primer or a silane coupling agent. In this case, the surface modification layer must adhere to the base, and must have high heat resistance and/or chemical resistance according to demand. Additionally, the surface modification layer is required to be a uniform thin film on the order of a micrometer or less.

In an ink-jet recording apparatus, ink drops of a few picoliters must be stably discharged, by means of thermal or mechanical energy, from the discharge nozzle of a recording head toward a recording medium in response to recording signals in order to produce precise printing. Thus, the ink discharge nozzle must be made with greatest precision by using a suitable material, such as a plastic. For example, in recording heads for ink-jet recording apparatus, an ink-repellent layer is formed uniformly on a plastic, e.g. an epoxy or polysulfone resin, nozzle with an orifice having an inner diameter of around 30 μm, so that the ink is stably discharged toward the recording medium as ink drops of a specific volume.

In order to form a thin film comprising an ink-repellent agent on such a precise object, the surface of the base must be preliminarily modified so that the ink-repellent agent readily and uniformly adheres to it. Characteristics required for a surface modification layer include a thickness on the order of angstroms, excellent uniformity, and high resistance to heat and chemicals. No prior art surface modification layer satisfies such characteristics.

SUMMARY OF THE INVENTION

It is an object of the present invention to provide a method for treating the surface of a base and a method for making an ink-jet recording head using the same, wherein a surface modification layer having a thickness of a few angstrom is readily formed on the surface of a base, such as a plastic, having a complicated shape, does not adversely affect the base or an ink-repellent layer which will be provided thereon, adheres well to the base and the ink-repellent layer, and exhibits high resistance to heat and chemicals.

In accordance with one embodiment of the present invention, a method for treating the surface of a base comprises the step of applying a coating solution containing a material selected from the group consisting of alumina sol, silanol, and perhydropolysilazane represented by the following general formula (I), on the surface of the base,

forming a surface modification layer by drying and curing the coating solution at a temperature which does not form a ceramic from the material, and forming an ink-repellent layer on the surface modification layer.

In accordance with another embodiment of the present invention, a method for making an ink-jet recording head is provided, in which a resin layer is provided on a base, a plurality of ink channels, parallel to the surface of the base, are provided in the resin layer, and the ends of the channels form a plurality of ink discharge nozzles. This method comprises the step of applying a coating solution containing a material selected from the group consisting of alumina sol, silanol, and perhydropolysilazane represented by the following general formula (I), on the surface of the ink discharge nozzle,

forming a surface modification layer by drying and curing the coating solution at a temperature which does not form a ceramic from the material, and forming an ink-repellent layer on the surface modification layer.

DESCRIPTION OF THE PREFERRED EMBODIMENTS

In the present invention, a material selected from alumina sol, silanol, and perhydropolysilazane represented by the following general formula (I):

(I)

is used for a surface modification layer in an inorganic polymeric state so as not to form a ceramic. The surface modification layer exhibits excellent heat resistance and flexibility, minimal shrinkage during curing, and excellent chemical resistance. Further, the surface modification layer has excellent adhesiveness to the base, such as a plastic, which may be unsuitable for high temperature treatment, and has excellent wettability to a coating solution containing an ink-repellent agent to be applied to it. Thus, various treatments may be performed on such a surface modification layer.

Among materials for such surface modification layers, perhydropolysilazane is preferably used. This material is soluble in most aromatic hydrocarbon solvents, and has excellent film forming ability, to the extent that it forms a uniform thin film on the order of angstroms. Therefore, a uniform surface modification layer can be formed on a precise object.

Preferably, the number average molecular weight of the perhydropolysilazane in accordance with the present invention ranges from 600 to 2,000. A number average molecular weight over 2,000 decreases the flexibility of the formed film and its adhesiveness to the base, whereas a number average molecular weight of less than 600 decreases the resistance of the formed film to heat and chemicals.

The method for treating the surface in accordance with the present invention includes the steps of applying a coating solution containing the material set forth above onto a base, such as a plastic; drying and curing it to form a surface modification layer at a temperature that will not form a ceramic from the material; and applying an ink-repellent agent thereon.

Solvents suitable for preparing the coating solution may include aromatic hydrocarbon solvents, e.g. toluene and xylene. The content of the material set forth above dissolved into such solvents can be adequately selected within the range in which a uniform thin film of the inorganic polymer can be formed, for example, preferably 0.5 to 2 weight percent in xylene.

The temperature for drying and curing the coating solution is preferably a temperature at which a ceramic will not form from the material set forth above, for example, 200° C. or less, and more preferably around 100° C. When the temperature is higher than 200° C., the formed film is converted to a ceramic, which exhibits excellent resistance to heat and chemicals, but lacks flexibility and adhesiveness to the base, particularly to plastics.

EXAMPLES

The present invention is now explained in more detail with reference to EXAMPLES and COMPARATIVE EXAMPLES.

Figure 2:
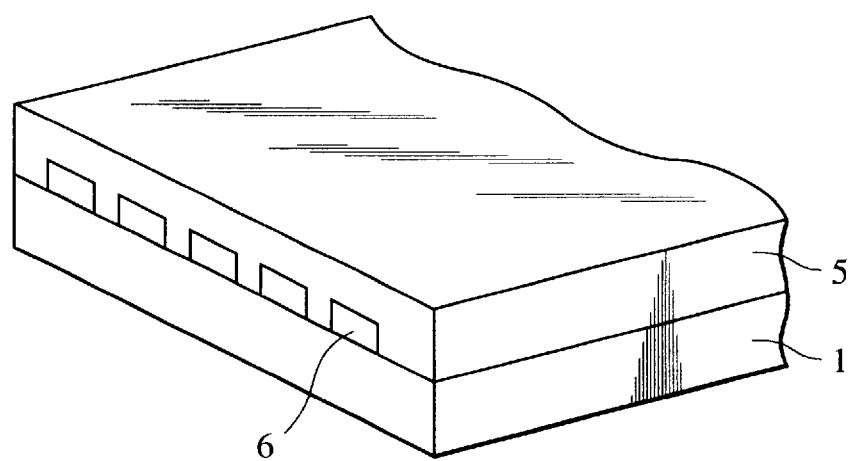
FIG. 2 is a perspective view of an ink-jet recording head.

As an example, a method for treating the surface of an ink discharge nozzle of an ink-jet recording head shown in FIG. 2 which is subjected to an ink-repellent treatment will be explained, but the method of the invention is not limited to such a treatment.

EXAMPLE 1

An ink discharge nozzle of a recording head for an ink-jet recording apparatus was formed by the following processes, with reference to FIG. 1. A positive-type photoresist AZ-4903 by Hoechst was spin-coated so as to form a film of 30 μm on a glass substrate 1 on which an electrothermal transducer (not shown in the figure) has been formed as an element for generating liquid discharge energy. The substrate was preliminarily baked at 90° C. for 20 minutes in an oven to form a resist layer 2, as shown in FIG. 1(a). The resist layer was subjected to a pattern exposure of 200 mJ/cm using a Canon mask aligner PLA-501 through a mask 3 having a nozzle pattern, as shown in FIG. 1(b). The resist layer was developed with a 0.75 weight percent aqueous sodium hydroxide solution followed by rinsing with deionized water to form a nozzle pattern 4 comprising the resist (FIG. 1(c)).

Then, the substrate was twice subjected to the following processes: Postbaking at 700° C. for 30 minutes in a oven; overall exposure of 150 mJ/cm; and degassing by evacuation at 0.1 mm Hg for 30 minutes.

Figure 1A:
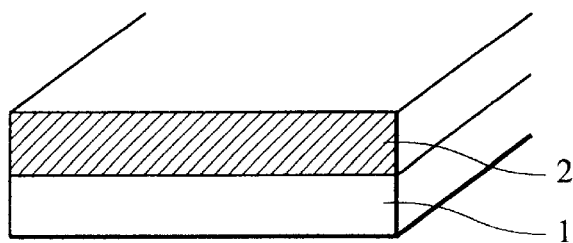
FIGS. 1(a), 1(b), 1(c), 1(d), 1(e), 1(f), 1(g), 1(h) are a series of cross-sectional views illustrating a process for making an ink-jet recording head in accordance with the present invention.
Figure 1B:
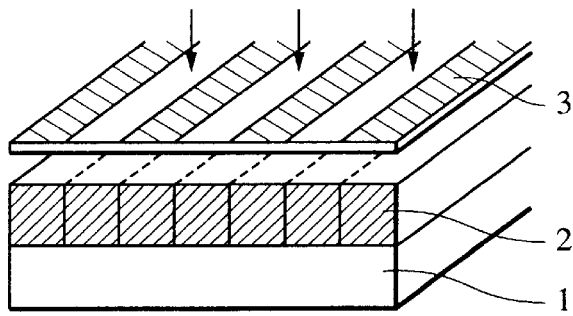
Figure 1C:
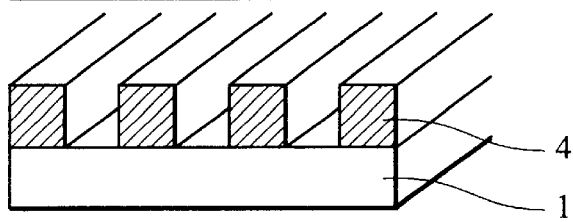
Figure 1D:
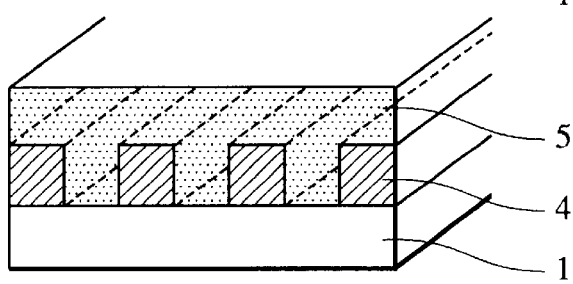
Figure 1E:
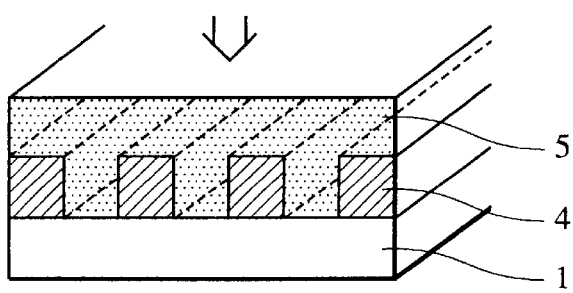

A thermoset resin coating solution 5 comprising the following Resin Composition 1 was applied to the substrate with the nozzle pattern (FIG. 1(d)), was allowed to stand at 30° C. for 24 hours, and was subjected to thermal curing at 120° C. for 2 hours (FIG. 1(e)).

Formulation of Resin Composition 1:

| | |
|---|---|
| Adeka Optmer KRM2410 made by Asahi Denka Kogyo K.K. | 70 pbw |
| Adeka Resin EP-4000 made by Asahi Denka Kogyo K.K. | 30 pbw |
| NUC silane coupling agent A-187 made by Nippon Unicar Co., Ltd. | 2 pbw |
| Fujicure 6010 made by Fuji Kasei Kogyo Co., Ltd. | 50 pbw |

Figure 1F:
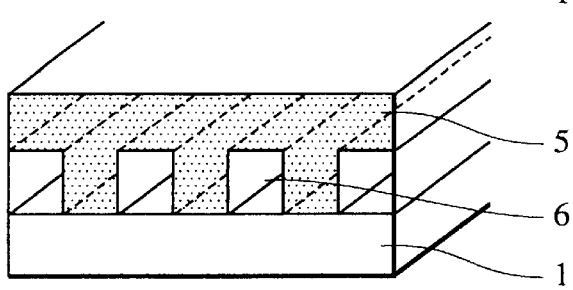

Then, the material in the nozzle pattern was removed with a 3 weight percent aqueous sodium hydroxide solution followed by rinsing with deionized water to form the discharge nozzle 6 (FIG. 1(f)) of the recording head for the ink-jet recording apparatus.

Figure 1G:
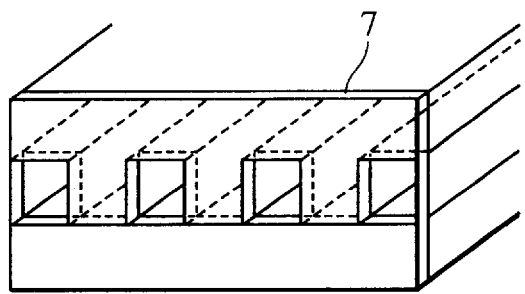
Figure 1H:
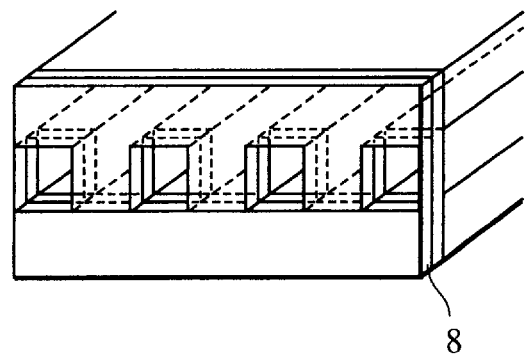

Then, a 1% polysilazane solution in xylene made by Tonen Corporation was applied to the discharge nozzle prepared by the processes set forth above, and cured at 100° C. for 1 hour to form a surface modification layer 7 (FIG. 1(g)). An ink-repellent agent, CTX-805A made by Asahi Glass Co., Ltd., was applied to the discharge nozzle surface followed by drying at 150° C. for 5 hours to form an ink-repellent layer 8 (FIG. 1(h)). The ink-repellent agent was uniformly applied to the discharge nozzle in this procedure.

After this recording head was mounted in a printer and was subjected to a printing durability test using 1,000 pieces of recording paper, the status of the discharge nozzle was observed with a microscope.

The results of a printing durability test demonstrate that the ink-repellent layer exhibits excellent adhesiveness without peeling off, sufficient to achieve stable printing. No defect in the discharge nozzle was visually observed after the durability test. Thus, the discharge nozzle of the recording head formed by the method in accordance with the present invention exhibits excellent resistance to heat and chemicals.

Figure 3:
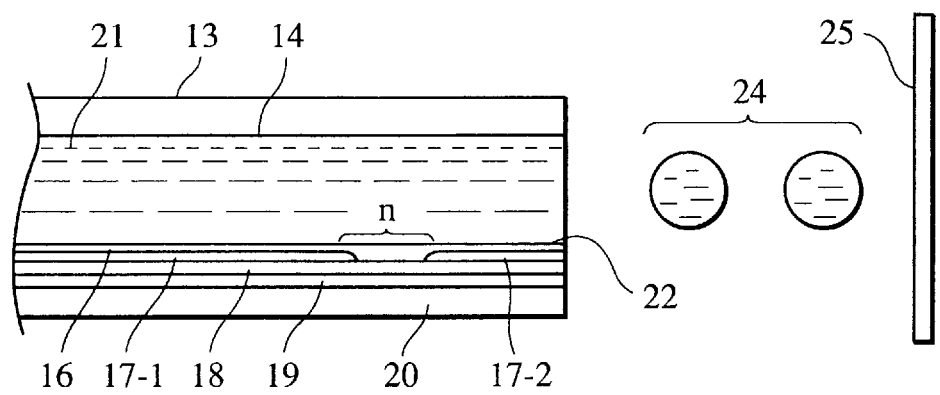
FIG. 3 is a fragmentary longitudinal sectional view along the ink channel in an ink-jet recording head.

FIG. 3 is a cross-sectional view of the main section in the liquid channel of an embodiment of a recording head according to the invention. A wall surface 14, which forms ink channels in the recording head 13, is composed of the cured thermoset resin set forth above. On substrate 20, made of a heat-dissipative material, such as alumina, a heat accumulating layer 19, a heat resistive layer 18 formed of nichrome or the like, electrodes 17-1 and 17-2, made of aluminum or the like, and a protective layer 16 are separately formed. When electric signals are applied through the electrodes 17-1 and 17-2, the region (shown as n in the figure) of the heat resistive layer 18, on which the electrodes are not layered, is heated to supply thermal energy to ink 21 in contact with region n.

During recording, the discharge nozzle or orifice 22, which is a fine end opening of the ink channel 14, is filled with ink 21. When electric signals are applied in response to recording signals through electrodes 17-1 and 17-2, region n is rapidly heated. This forms bubbles in the ink 21 which is in contact with region n. The pressure due to the bubbles causes the ink 21 to be discharged as drops 24 from the discharge nozzle 22 toward a recording medium 25.

Examples 2 and 3

Recording heads were formed by the same procedure as in Example 1 except that alumina sol (Trade Name: Alumisol CSA-110AD made by Kawaken Fine Chemicals Co., Ltd.) and silanol (Trade Name: OCD Type-2 made by Tokyo Ohka Kogyo Co., Ltd.) were used instead of perhydropolysilazane, respectively. Almost the same results as those in Example 1 were obtained, except for the slight decrease in repellency.

Comparative Example 1

After a procedure similar to Example 1 except that the polysilazane thin film was not formed, the ink-repellent agent, CTX-805A made by Asahi Glass Co., Ltd., was applied to the ink-jet discharge nozzle surface followed by drying to complete the ink-repellent treatment.

The wettability of the ink-repellent agent to the base material forming the discharge nozzle was unsatisfactory due to the non-uniformity of the ink-repellent layer.

Comparative Example 2

On the ink discharge nozzle of the ink-jet recording head prepared in Example 1, 1% silane coupling agent A-186 (made by Nippon Unicar Co., Ltd.) in isopropyl alcohol solution was applied, and dried at 100° C. for 1 hour to form a thin film for modifying the surface. Then, the same ink-repellent agent CTX-805 (made by Asahi Glass Co., Ltd.) as in Example 1 was applied to the discharge nozzle surface.

Although the ink-repellent agent was able to be uniformly coated on the ink discharging surface unlike the situation in Comparative Example 1, the ink-repellent layer was peeled off during the printing durability test performed in Example 1 because the adhesiveness of the surface modification layer, and its resistance to heat and chemical agents were unsatisfactory, resulting in a failure to perform smooth ink-jet recording.

Comparative Example 3

The ink discharge nozzle of the ink-jet recording head prepared in Example 1 was subjected to a surface treatment by oxygen plasma ashing under the conditions of 1 kW, 500 sccm, and 1.5 torr. The same ink-repellent agent CTX-805A made by Asahi Glass Co., Ltd. as in Example 1 was applied to the discharge nozzle surface and dried. Although the ink-repellent agent was able to be uniformly coated, unlike Comparative Example 1, satisfactory printing was not achieved due to peeling off of the ink-repellent layer. This was because of the poor adhesiveness of the surface modification layer during the printing durability test as performed in Example 1.

In accordance with the present invention, as described above, a surface modification layer comprising a uniform thin film on the order of angstroms can be readily formed on a surface of a base, such as a plastic, having a precise shape, and the formed thin film has excellent resistance to heat and chemicals because it is an inorganic polymer layer.

Additionally, because the formed surface modification layer of the inorganic polymer is not converted to ceramic, the layer has flexibility as well as excellent resistance to heat and chemicals, and thus can improve the adhesiveness to a repellent ink layer provided on the surface modification layer.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for treating a surface of a plastic base comprising the steps of:

applying a coating solution containing a material selected from the group consisting of alumina sol, silanol sol, and perhydropolysilazane represented by the following general formula (I), on the surface of the plastic base;

forming a thin film surface modification layer by drying and curing the coating solution at a temperature which does not damage the plastic base; and forming an ink-repellent layer on the surface modification layer.

2. A method for treating a surface of a base according to claim 1, wherein said coating solution contains perhydropolysilazane having a number average molecular weight in a range from 600 to 2,000.

3. A method for treating a surface of a base according to claim 1, wherein the temperature which does not damage the plastic base is 200° C. or less.

4. A method for treating a surface of a base according to claim 1, wherein the temperature not damaging the plastic base is 100° C. or less.

5. A method for making an ink-jet recording head comprising the steps of:

providing a plastic base;

providing a resin layer on the base;

providing a plurality of ink channels parallel to a surface of the base in the resin layer, the ends of the channels forming a plurality of ink discharge nozzles;

applying a coating solution comprising a material selected from the group consisting of alumina sol, silanol sol, and perhydropolysilazane represented by the following general formula (I), on a surface of the ink discharge nozzles;

forming a surface modification layer by drying and curing the coating solution at a temperature which does not damage the plastic base; and forming an ink-repellent layer on the surface modification layer.

6. A method for making an ink-jet recording head according to claim 5, wherein said coating solution contains perhydropolysilazane having a number average molecular weight in a range from 600 to 2,000.

7. A method for making an ink-jet recording head according to claim 5, wherein the temperature which does not damage the plastic base is 200° C. or less.

8. A method for making an ink-jet recording head according to claim 5, wherein the temperature which does not damage the plastic base is 100° C. or less.

* * * * *

UNITED STATES PATENT AND TRADEMARK OFFICE
CERTIFICATE OF CORRECTION

PATENT NO. : 5,770,271

DATED : June 23, 1998

INVENTOR(S) : ISAO IMAMURA

It is certified that error appears in the above-identified patent and that said Letters Patent is hereby corrected as shown below:

<u>COLUMN 2</u>:

```
Line 52, "1(g)," should read --1(g) and--.
```

Signed and Sealed this

Ninth Day of March, 1999

Attest:

Q. TODD DICKINSON

*Attesting Officer*     *Acting Commissioner of Patents and Trademarks*